(12) United States Patent
Fujishiro et al.

(10) Patent No.: US 10,531,458 B2
(45) Date of Patent: Jan. 7, 2020

(54) USER TERMINAL, SERVICE CONTROL APPARATUS, AND BASE STATION

(71) Applicant: KYOCERA CORPORATION, Kyoto (JP)

(72) Inventors: Masato Fujishiro, Yokohama (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 12 days.

(21) Appl. No.: 15/512,349

(22) PCT Filed: Sep. 15, 2015

(86) PCT No.: PCT/JP2015/076179
§ 371 (c)(1),
(2) Date: Mar. 17, 2017

(87) PCT Pub. No.: WO2016/047507
PCT Pub. Date: Mar. 31, 2016

(65) Prior Publication Data
US 2017/0280455 A1  Sep. 28, 2017

Related U.S. Application Data

(60) Provisional application No. 62/055,410, filed on Sep. 25, 2014.

(51) Int. Cl.
*H04W 72/04* (2009.01)
*H04W 4/02* (2018.01)
*H04W 92/18* (2009.01)
(52) U.S. Cl.
CPC ....... *H04W 72/0453* (2013.01); *H04W 4/023* (2013.01); *H04W 92/18* (2013.01)

(58) Field of Classification Search
CPC .......................... H04W 72/0453; H04W 4/023
See application file for complete search history.

(56) References Cited

U.S. PATENT DOCUMENTS 8,509,792 B1 * 8/2013 Oroskar ................ H04W 72/00
2005/0227698 A1 * 10/2005 Nonin ....................... H04Q 7/20
(Continued)

FOREIGN PATENT DOCUMENTS

JP  2013-42261 A   2/2013
JP  2015-173446 A  10/2015
(Continued)

OTHER PUBLICATIONS

International Search Report issued in PCT/JP2015/076179; dated Nov. 24, 2015.
(Continued)

*Primary Examiner* — Ronald B Abelson
(74) *Attorney, Agent, or Firm* — Studebaker & Brackett PC

(57) ABSTRACT

A user terminal according to a first aspect is used in a mobile communication system which supports a D2D proximity service for enabling direct device-to-device communication. The user terminal comprises a controller configured to obtain mapping information indicating a correspondence relationship between a D2D application and a frequency to be used for the D2D application, the D2D application being an application of the D2D proximity service. The controller determines the frequency to be used for the D2D application based on the mapping information.

4 Claims, 7 Drawing Sheets

(56) References Cited

U.S. PATENT DOCUMENTS

| | | | |
|---|---|---|---|
| 2008/0113662 A1* | 5/2008 | Kuo | H04M 3/00 |
| 2008/0235040 A1* | 9/2008 | Ratliff | G06Q 10/00 |
| 2010/0238875 A1* | 9/2010 | Sung | H04W 72/04 |
| 2010/0316004 A1* | 12/2010 | Macias | H04W 72/02 370/329 |
| 2014/0211685 A1* | 7/2014 | Kim | H04W 72/005 |
| 2015/0016354 A1* | 1/2015 | Yie | H04L 5/003 |
| 2015/0139176 A1 | 5/2015 | Morita et al. | |
| 2015/0189532 A1* | 7/2015 | Dimou | H04W 28/021 |
| 2015/0264663 A1 | 9/2015 | Chen et al. | |
| 2015/0312836 A1 | 10/2015 | Fukuta | |
| 2016/0044552 A1* | 2/2016 | Heo | H04W 36/0083 |
| 2016/0278045 A1 | 9/2016 | Adachi et al. | |
| 2017/0064734 A1 | 3/2017 | Tsuboi et al. | |

FOREIGN PATENT DOCUMENTS

| | | |
|---|---|---|
| WO | 2013/183730 A1 | 12/2013 |
| WO | 2014/084028 A1 | 6/2014 |
| WO | 2015/046155 A1 | 4/2015 |
| WO | 2015/137208 A1 | 9/2015 |
| WO | 2015/140274 A1 | 9/2015 |
| WO | 2015/143170 A1 | 9/2015 |
| WO | WO2015139862 * | 9/2015 ........... H04W 72/12 |

OTHER PUBLICATIONS

Written Opinion issued in PCT/JP2015/076179; dated Nov. 24, 2015.
3rd Generation Partnership Project; Technical Specification Group Radio Access Network; Study on LTE Device to Device Proximity Services; Radio Aspects; 3GPP TR 36.843 V12.0.1; Mar. 2014; pp. 1-50; Release 12; 3GPP Organizational Partners.
ZTE Corporation, "Resource Pools for D2D Communication", 3GPP TSG-RAN WG2 Meeting #85bis, R2-141483, Mar. 31-Apr. 4, 2014, Agenda item: 7.4.2, 5 pages, Valencia, Spain.
Catt, "Resource Pool for D2D Communication", 3GPP TSG RAN WG2 Meeting #85, R2-140070, Prague, Czech Republic, Feb. 10-14, 2014, Agenda item: 7.53, 4 pages.

\* cited by examiner

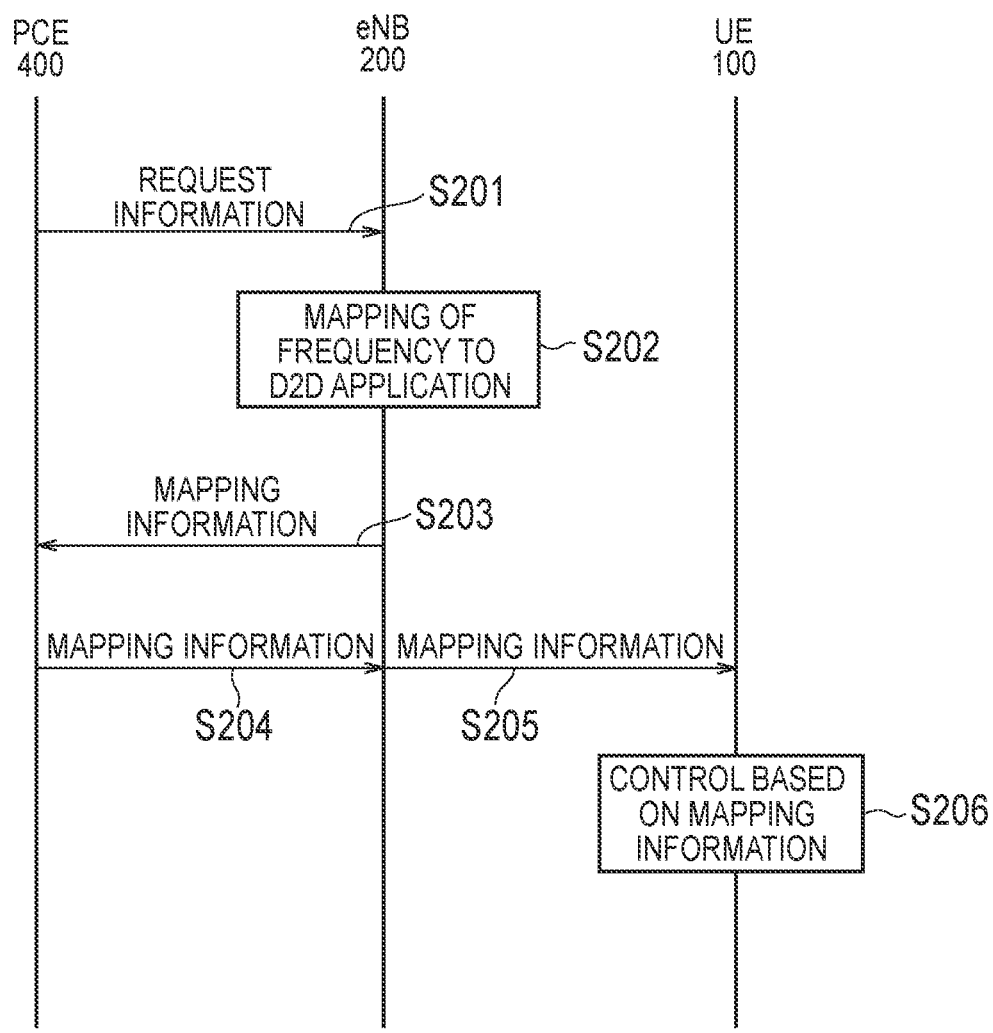

USER TERMINAL, SERVICE CONTROL APPARATUS, AND BASE STATION

TECHNICAL FIELD

The present application relates to a user terminal, a service control apparatus, and a base station which are used in a mobile communication system.

BACKGROUND ART

In 3GPP (3rd Generation Partnership Project) which is a project aiming to standardize a mobile communication system, specification of a device-to-device (D2D) proximity service has been promoted as a new feature after Release 12 (see Non Patent Document 1).

The D2D proximity service (D2D ProSe) is a service for enabling direct device-to-device communication within a synchronization cluster including a plurality of pieces of user terminals which are synchronized with one another. The D2D proximity service includes discovery procedures (Discovery) of discovering a proximity terminals and D2D communication (Communication) that is direct device-to-device communication.

As an application for the D2D proximity service (hereinafter, referred to as a D2D application), a public safety application, a vehicle-to-vehicle communication application, and the like are assumed, besides a phone application.

PRIOR ART DOCUMENT

Non-Patent Document

Non Patent Document 1: 3GPP Technical Report "TR 36.843 v12.0.1" March, 2014

SUMMARY

It is an object of the present application to provide a user terminal, a service control apparatus, and a base station, which are capable of ensuring a predetermined level of service quality for a specific D2D application.

A user terminal according to a first aspect is used in a mobile communication system which supports a D2D proximity service for enabling direct device-to-device communication. The user terminal comprises a controller configured to obtain mapping information indicating a correspondence relationship between a D2D application and a frequency to be used for the D2D application, the D2D application being an application of the D2D proximity service. The controller determines the frequency to be used for the D2D application based on the mapping information.

A service control apparatus according to a second aspect controls a D2D proximity service that enables direct device-to-device communication. The service control apparatus comprises a controller configured to map a frequency to be used for a D2D application to the D2D application that is an application of the D2D proximity service. The controller notifies a user terminal or a base station of mapping information indicating a correspondence relationship between the D2D application and the frequency.

A base station according to a third aspect is used in a mobile communication system which supports a D2D proximity service for enabling direct device-to-device communication. The base station comprises a controller to map a frequency to be used for a D2D application to the D2D application that is an application of the D2D proximity service. The controller notifies a user terminal or a service control apparatus which controls the D2D proximity service of mapping information indicating a correspondence relationship between the D2D application and the frequency.

BRIEF DESCRIPTION OF DRAWINGS

FIG. 9 is a sequence diagram illustrating an operation sequence according to the second embodiment.

DESCRIPTION OF THE EMBODIMENT

Overview of Embodiments

Figure 1:
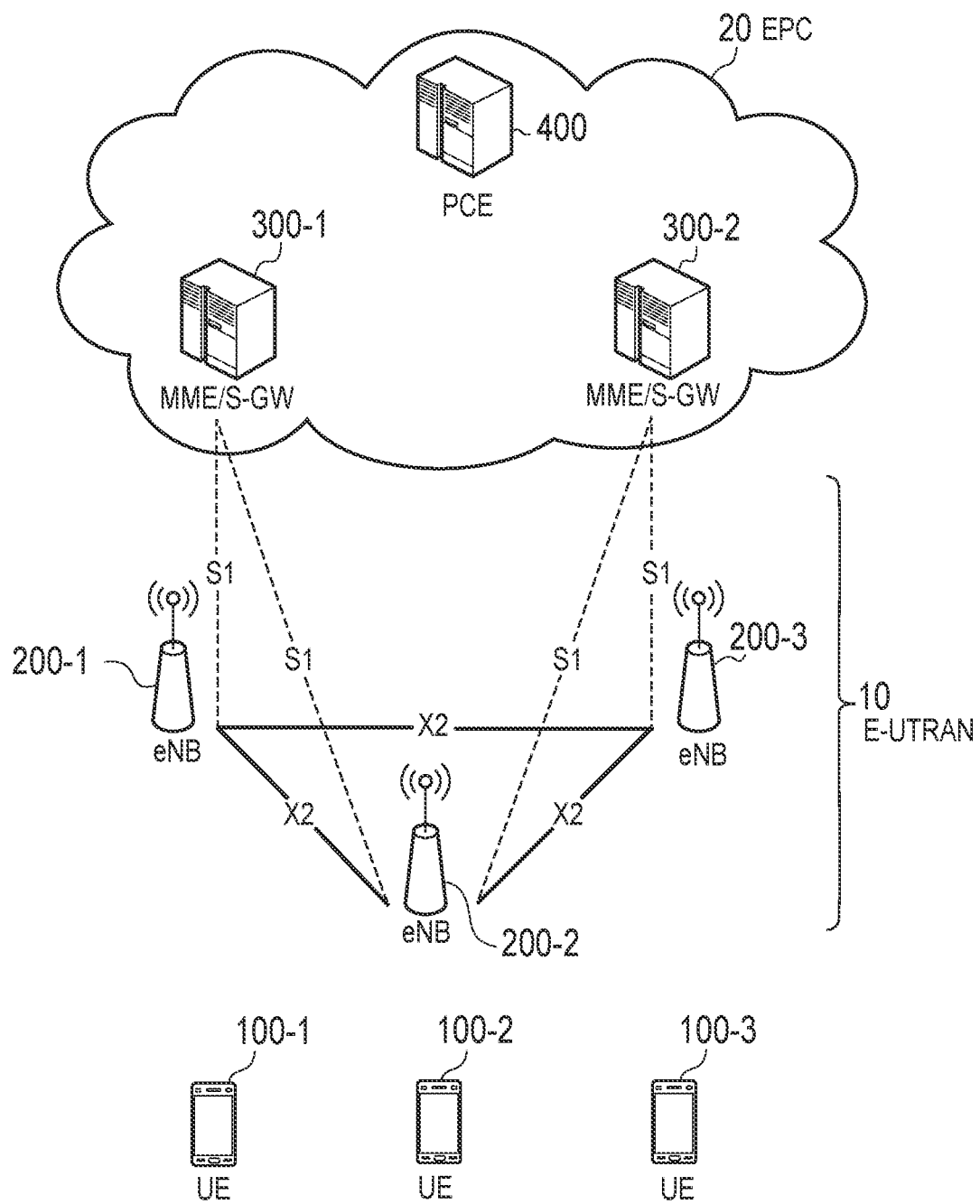
FIG. 1 is a diagram illustrating a configuration of an LTE system according to a first embodiment to a third embodiment of the present application.

A user terminal according to a first embodiment through a third embodiment is used in a mobile communication system which supports a D2D proximity service for enabling direct device-to-device communication. The user terminal comprises a controller configured to obtain mapping information indicating a correspondence relationship between a D2D application and a frequency to be used for the D2D application, the D2D application being an application of the D2D proximity service. The controller determines the frequency to be used for the D2D application based on the mapping information.

In the first embodiment and the second embodiment, the controller obtains the mapping information from a service control apparatus which controls the D2D proximity service, or a base station which manages a cell on which the user terminal camps.

In the third embodiment, the mapping information is stored in a storage medium detachable from the user terminal. The controller obtains the mapping information from the storage medium.

In the first embodiment through the third embodiment, the controller transmits a D2D interest notification related to the D2D proximity service to the base station when the user terminal is in a connected state in a cell of the base station. The D2D interest notification includes information on the frequency mapped to the D2D application in which the user terminal is interested.

In the first embodiment through the third embodiment, the controller performs cell reselection by preferentially selecting the frequency mapped to the D2D application in which the user terminal is interested, when the user terminal is in an idle state in a cell of the base station.

A service control apparatus according to the first embodiment controls a D2D proximity service that enables direct device-to-device communication. The service control apparatus comprises a controller configured to map a frequency to be used for a D2D application to the D2D application that is an application of the D2D proximity service. The controller notifies a user terminal or a base station of mapping information indicating a correspondence relationship between the D2D application and the frequency.

In the first embodiment, the controller obtains a frequency or a plurality of frequencies supporting the D2D proximity service and maps a frequency selected from the frequency or the plurality of frequencies to the D2D application.

In the first embodiment, in response to a request from the user terminal or the base station, the controller notifies a request source having issued the request of the mapping information.

A base station according to the second embodiment is used in a mobile communication system which supports a D2D proximity service for enabling direct device-to-device communication. The base station comprises a controller to map a frequency to be used for a D2D application to the D2D application that is an application of the D2D proximity service. The controller notifies a user terminal or a service control apparatus which controls the D2D proximity service of mapping information indicating a correspondence relationship between the D2D application and the frequency.

In the second embodiment, the controller obtains, from the service control apparatus, information on a frequency or a plurality of frequencies to be used for the D2D application or information on service quality to be ensured for the D2D application, maps a frequency selected based on the obtained information to the D2D application, and notifies the service control apparatus of the mapping information.

First Embodiment

Hereinafter, a description of an embodiment in a case where the present application is applied to an LTE system will be given.

(System Configuration)

FIG. 1 is a configuration diagram of an LTE system according to a first embodiment. As illustrated in FIG. 1, the LTE system according to the first embodiment includes a plurality of UEs (User Equipments) 100, E-UTRAN (Evolved-Universal Terrestrial Radio Access Network) 10, and EPC (Evolved Packet Core) 20.

The UE 100 corresponds to a user terminal. The UE 100 is a mobile communication device and performs radio communication with a cell (a serving cell) with which a connection is established. Configuration of the UE 100 will be described later.

The E-UTRAN 10 corresponds to a radio access network. The E-UTRAN 10 includes a plurality of eNBs (evolved Node-Bs) 200. The eNB 200 corresponds to a base station. The eNBs 200 are connected mutually via an X2 interface. Configuration of the eNB 200 will be described later.

The eNB 200 manages one or a plurality of cells and performs radio communication with the UE 100 which establishes a connection with the cell of the eNB 200. The eNB 200 has a radio resource management (RRM) function, a routing function for user data, and a measurement control function for mobility control and scheduling, and the like. It is noted that the "cell" is used as a term indicating a minimum unit of a radio communication area, and is also used as a term indicating a function or resources of performing radio communication with the UE 100.

The EPC 20 corresponds to a core network. The network of the LTE system is constituted by the E-UTRAN 10 and the EPC 20. The EPC 20 includes a plurality of MME (Mobility Management Entity)/S-GWs(Serving-Gateways) 300. The MME performs various mobility controls and the like for the UE 100. The S-GW performs control to transfer user data. MME/S-GW 300 is connected to eNB 200 via an S1 interface.

In the first embodiment, the EPC 200 includes a ProSe Control Entity (PCE) 400 that controls D2D proximity service (D2D ProSe). The PCE 400 corresponds to a service controller apparatus. The PCE 400 is not the EPC 200. The PCE 400 may be included in the E-UTRA 10. Configuration of the PCE 400 will be described later.

Figure 2:
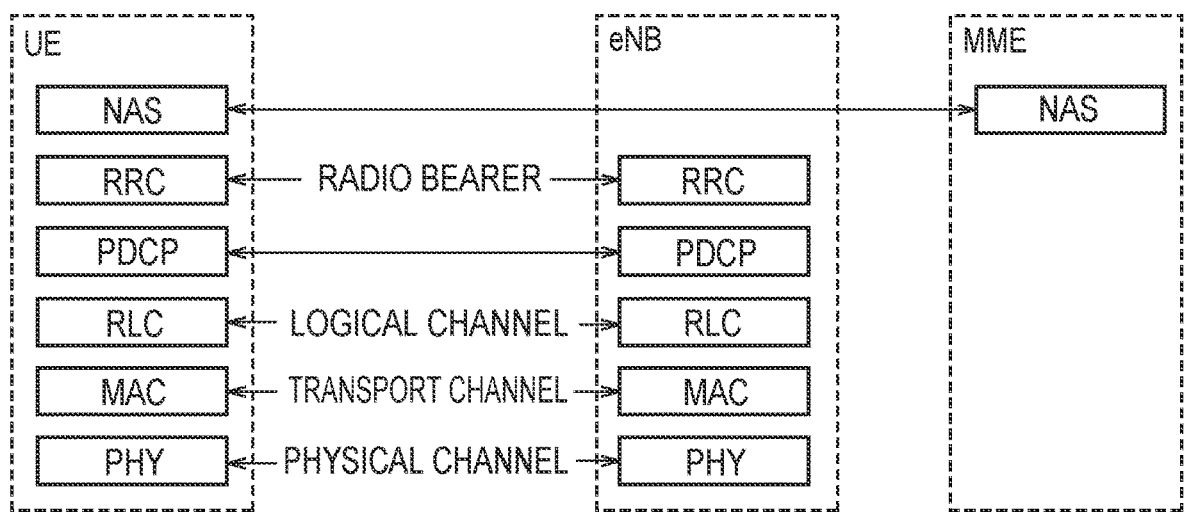
FIG. 2 is a diagram illustrating a protocol stack of a radio interface in the LTE system according to the first embodiment to the third embodiment.

FIG. 2 is a protocol stack diagram of a radio interface in the LTE system. As illustrated in FIG. 2, the radio interface protocol is classified into a layer 1 to a layer 3 of an OSI reference model, wherein the layer 1 is a physical (PHY) layer. The layer 2 includes a MAC (Media Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, user data and control signal are transmitted via the physical channel.

The MAC layer performs priority control of data, a retransmission process by hybrid ARQ (HARQ), and the like. Between the MAC layer of the UE 100 and the MAC layer of the eNB 200, user data and control signal are transmitted via a transport channel. The MAC layer of the eNB 200 includes a scheduler that determines (schedules) a transport format of an uplink and a downlink (a transport block size and a modulation and coding scheme) and a resource block to be assigned to the UE 100.

The RLC layer transmits data to an RLC layer of a reception side by using the functions of the MAC layer and the PHY layer. Between the RLC layer of the UE 100 and the RLC layer of the eNB 200, user data and control signal are transmitted via a logical channel.

The PDCP layer performs header compression and decompression, and encryption and decryption.

The RRC layer is defined only in a control plane dealing with control signal. Between the RRC layer of the UE 100 and the RRC layer of the eNB 200, control message (RRC messages) for various types of configuration are transmitted. The RRC layer controls the logical channel, the transport channel, and the physical channel in response to establishment, re-establishment, and release of a radio bearer. When there is a connection (RRC connection) between the RRC of the UE 100 and the RRC of the eNB 200, the UE 100 is in a connected state (RRC connected state), otherwise the UE 100 is in an idle state (RRC idle state).

A NAS (Non-Access Stratum) layer positioned above the RRC layer performs a session management, a mobility management and the like. Upper layer signaling is transmitted and received between the UE 100 and the MME 300. In the first embodiment, upper layer signaling may be transmitted and received between the UE 100 and the PCE 400.

Figure 3:
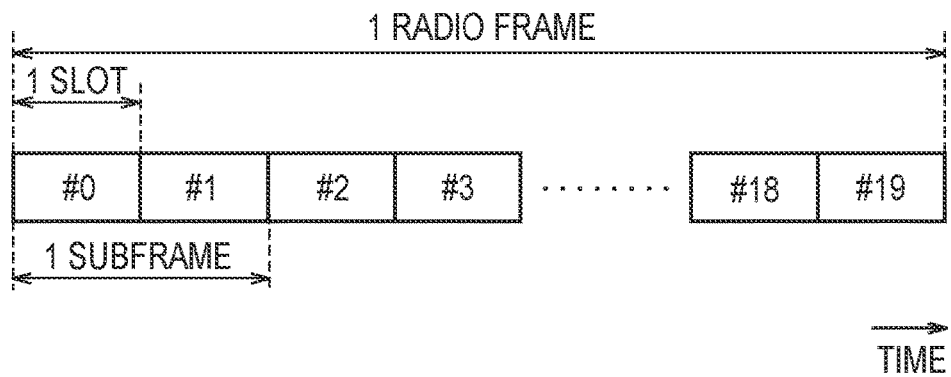
FIG. 3 is a configuration diagram of a radio frame used in the LTE system according to the first embodiment to the third embodiment.

FIG. 3 is a configuration diagram of a radio frame used in the LTE system. In the LTE system, OFDMA (Orthogonal Frequency Division Multiple Access) is applied to a downlink (DL), and SC-FDMA (Single Carrier Frequency Division Multiple Access) is applied to an uplink (UL), respectively.

As illustrated in FIG. 3, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RB) in a frequency direction, and a plurality of symbols in the time direction. The resource block includes a plurality of subcarriers in the frequency direction. A resource element is configured by one subcarrier and one symbol. Among radio resources assigned to the UE 100, a frequency resource can be configured by a resource block and a time resource can be configured by a subframe (or slot).

(D2D Proximity Service)

Figure 4:
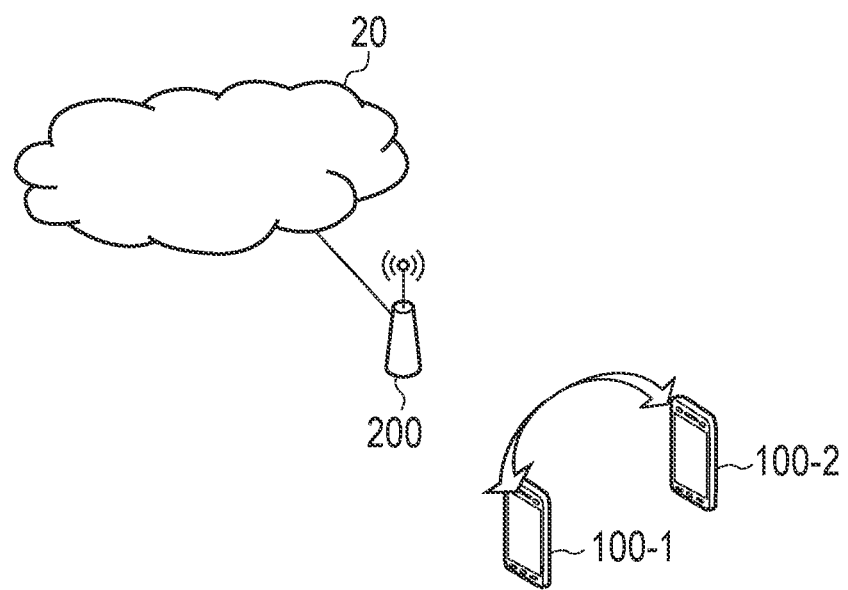
FIG. 4 is a diagram for describing a D2D proximity service according to the first embodiment to the third embodiment.

The LTE system according to the first embodiment supports the D2D proximity service (D2D ProSe). FIG. 4 is a diagram for describing the D2D proximity service.

As illustrated in FIG. 4, the D2D proximity service is a service that allows direct device-to-device communication in a synchronization cluster including a plurality of UEs 100, each of the UEs being synchronized with one another. The D2D proximity service includes discovery procedures (Discovery) of discovering a proximity terminals and D2D communication (Communication) that is direct device-to-device communication.

A frequency used for the D2D proximity service is used in common as a frequency used for cellular communication. Alternatively, the frequency used for the D2D proximity service may be different from the frequency used for cellular communication.

Also, the frequency used for the D2D proximity service is included in a frequency band (licensed band) of which a license is given to a cellular communication operator. Alternatively, the frequency used for the D2D proximity service may be included in a frequency band (unlicensed band) of which a license is not given to the cellular communication operator.

A case where all UEs 100 constituting the synchronization cluster are located within a cell coverage of the eNB 200 is referred to as "in coverage". In the case of "in coverage", the UEs 100 constituting the synchronization cluster may be distributed to a plurality of cells. A case where all UEs 100 constituting the synchronization cluster are located out of the cell coverage of the eNB 200 is referred to as "out of coverage". A case where some UEs 100 of the synchronization cluster are located within the cell coverage, and the remaining UEs 100 are located out of the cell coverage is referred to as "partial coverage".

As an application for the D2D proximity service (D2D application), a public safety application, a vehicle-to-vehicle communication application, and the like are assumed, besides a telephone application. The D2D application, such as the public safety application or the vehicle-to-vehicle communication application, is required to have a high level of service quality.

(Configuration of User Terminal)

Figure 5:
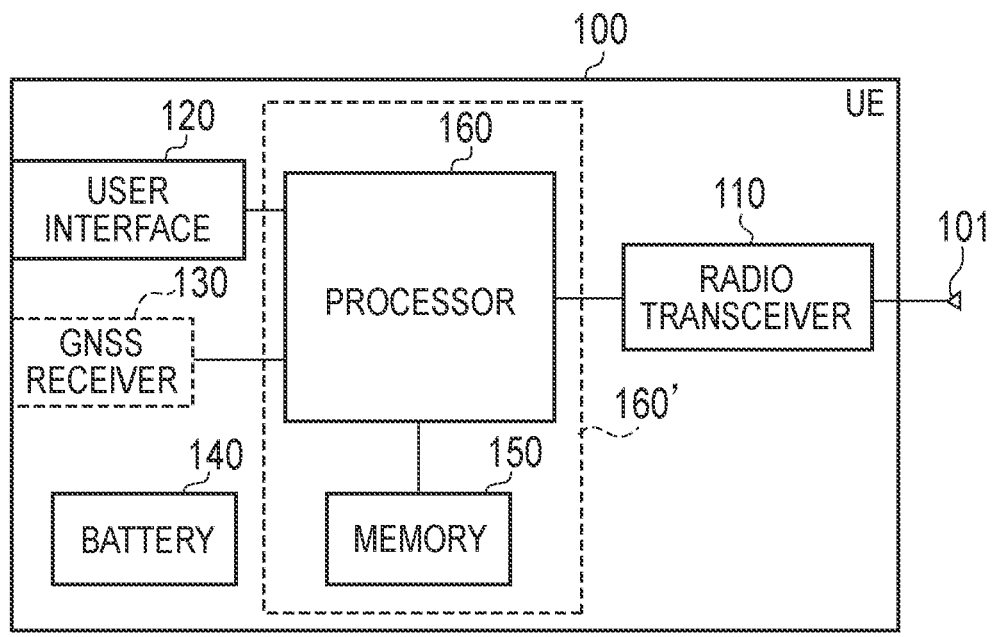
FIG. 5 is a block diagram of a UE (user terminal) 100 according to the first embodiment to the third embodiment.

FIG. 5 is a block diagram of a UE 100 (user equipment). As illustrated in FIG. 5, the UE 100 includes an antenna 101, a radio transceiver 110, a user interface 120, a GNSS (Global Navigation Satellite System) receiver 130, a battery 140, a memory 150, and a processor 160. The memory 150 corresponds to a storage unit, and the processor 160 corresponds to a controller. The UE 100 may not include the GNSS receiver 130. In addition, the memory 150 may be integrated with the processor 160 to use this set (that is, a chipset) as a processor 160'.

The antenna 101 and the radio transceiver 110 are used to transmit and receive a radio signal. The radio transceiver 110 converts a baseband signal (transmission signal) output from the processor 160 into a radio signal, and transmits the radio signal from the antenna 101. Furthermore, the radio transceiver 110 converts a radio signal received by the antenna 101 into a baseband signal (reception signal), and outputs the baseband signal to the processor 160.

The user interface 120 is an interface with a user carrying the UE 100, and includes, for example, a display, a microphone, a speaker, and various buttons. The user interface 120 receives an operation from a user and outputs a signal indicating the content of the operation to the processor 160. The GNSS receiver 130 receives a GNSS signal and outputs the received signal to the processor 160, in order to obtain location information indicating a geographical location of the UE 100. The battery 140 stores a power to be supplied to each block of the UE 100.

The memory 150 stores a program to be executed by the processor 160 and information to be used for processing by the processor 160. The memory 150 may include a storage medium (external storage medium) detachable from the UE 100, in addition to a storage medium (internal storage medium) fixed to the UE 100. Such an external storage medium may be called a universal subscriber identity module (USIM).

The processor 160 includes a baseband processor configured to perform modulation and demodulation, coding and decoding, and the like of the baseband signal, and a CPU (Central Processing Unit) configured to perform various processes by executing the program stored in the memory 150. The processor 160 may further include a codec that performs encoding and decoding of sound and video signals. The processor 160 executes a variety of types of processing and various types of communication protocols. Also, the processor 160 executes the D2D application that is an application for the D2D proximity service.

In the UE 100 configured as described above, the processor 160 obtains mapping information indicating a correspondence relationship between the D2D application and a frequency to be used for the D2D application. The processor 160 determines a frequency to be used for the D2D application, based on the mapping information.

According to the first embodiment, the processor 160 obtains the mapping information from the PCE 400 or the eNB 200 which manages a cell on which the UE 100 camps (serving cell). When the mapping information is obtained from the PCE 400, the processor 160 obtains the mapping information by, for example, non-access stratum (NAS) signaling. When the mapping information is obtained from the eNB 200, the radio transceiver 110 receives the mapping information which the eNB 200 has transmitted through dedicated RRC signaling or broadcast RRC signaling, and the processor 160 obtains the mapping information received by the radio transceiver 110.

In a case where the UE 100 is located within the cell coverage, when a frequency belonging to the serving cell is identical to a frequency mapped to a D2D application, the processor 160 executes the D2D application in the serving cell. When the frequency to which the serving cell belongs is not identical to the frequency mapped to the D2D application, the processor 160 performs handover to another cell or cell reselection to another cell by control which is described below.

In the first embodiment, when the UE 100 is in a connected state in the cell (serving cell) of the eNB 200, the processor 160 transmits a D2D interest notification related to the D2D proximity service to the eNB 200. The D2D interest notification includes information on frequencies mapped to D2D applications in which the UE 100 is interested. When the processor 160 executes a D2D application, the processor 160 may determine a frequency mapped to the executed D2D application based on the mapping information. In addition, the processor 160 transmits the D2D interest notification, including the information on the frequency mapped to the D2D application, to the eNB 200 (serving cell). In this way, when the serving cell belongs to a frequency different from the frequency mapped to the D2D application, the eNB 200 is urged to perform handover of the UE 100 to a frequency (another cell) mapped to the D2D application.

In the first embodiment, when the UE 100 is in an idle state in the cell (serving cell) of the eNB 200, the processor 160 performs cell reselection so as to preferentially select a frequency mapped to the D2D application in which the UE 100 is interested. The cell reselection is an operation of reselecting a serving cell (ranging cell) in the idle state. In the case of cell reselection, the serving cell is selected based on ranking determined by comparing a reception level of a serving cell and a reception level of a neighboring cell and frequency priority (cellReselectionPriority). Specifically, a cell belonging to a frequency having a high priority is preferentially selected as a serving cell. The processor 160 preferentially selects the frequency mapped to the D2D application in which the UE 100 is interested, by setting a frequency mapped to the D2D application in which the UE 100 is interested to the highest priority.

(Configuration of Base Station)

Figure 6:
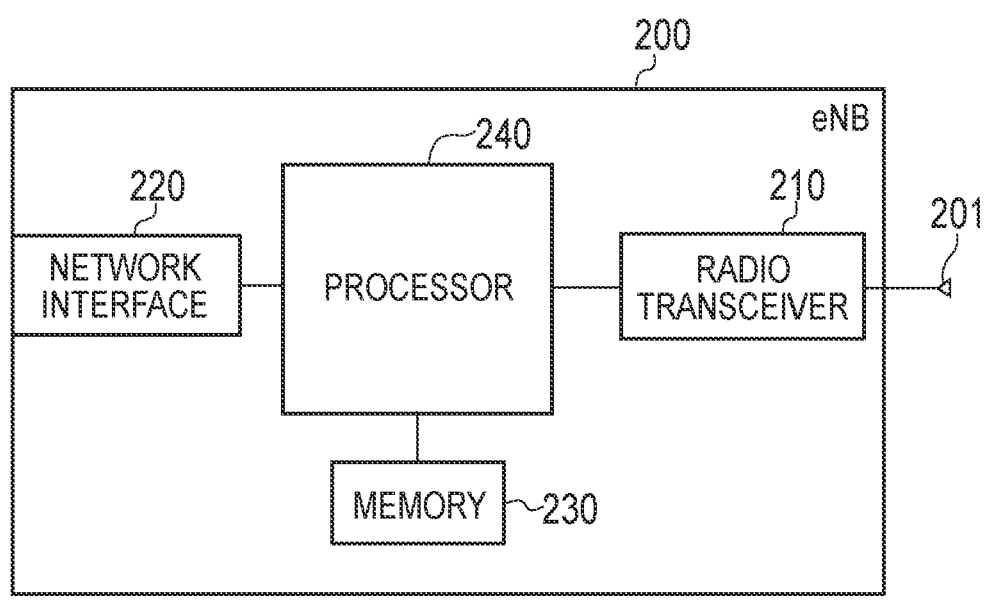
FIG. 6 is a block diagram of an eNB (base station) 200 according to the first embodiment to the third embodiment.

FIG. 6 is a block diagram of an eNB 200 (base station). As illustrated in FIG. 6, the eNB 200 includes an antenna 201, a radio transceiver 210, a network interface 220, a memory 230, and a processor 240. The memory 230 corresponds to a storage unit, and the processor 240 corresponds to a controller.

The antenna 201 and the radio transceiver 210 are used to transmit and receive a radio signal. The radio transceiver 210 converts a baseband signal (transmission signal) output from the processor 240 into the radio signal, and transmits the radio signal from the antenna 201. Furthermore, the radio transceiver 210 converts a radio signal received by the antenna 201 into a baseband signal (reception signal), and outputs the baseband signal to the processor 240.

The network interface 220 is connected to a neighboring eNB 200 through an X2 interface and is connected to a MME/S-GW 300 through an S1 interface. The network interface 220 is used in communication performed on the X2 interface and communication performed on the S1 interface. According to the first embodiment, the network interface 220 is used also in communication with the PCE 400.

The memory 230 stores a program to be executed by the processor 240 and information to be used for processing by the processor 240. The processor 240 includes a baseband processor configured to perform modulation and demodulation, coding and decoding, and the like of the baseband signal, and a CPU configured to perform various processes by executing the program stored in the memory 230. The processor 240 executes a variety of types of processing and various types of communication protocols.

According to the first embodiment, the processor 240 notifies the PCE 400 of information on a frequency or a plurality of frequencies at which the eNB 200 supports the D2D proximity service. The processor 240 may collectively notify the plurality of frequencies as one frequency band. In addition, the processor 240 obtains mapping information from the PCE 400.

The processor 240 stores the obtained mapping information in the memory 230. The processor 240 may transmit the mapping information to the UE 100, through dedicated RRC signaling or broadcast RRC signaling.

Also, when the radio transceiver 210 receives D2D interest notification including information on a frequency mapped to the D2D application in which the UE 100 is interested, the processor 240 may perform handover of the UE 100 to the frequency (another cell) mapped to the D2D application in which the UE 100 is interested.

(Configuration of Service Control Apparatus)

Figure 7:
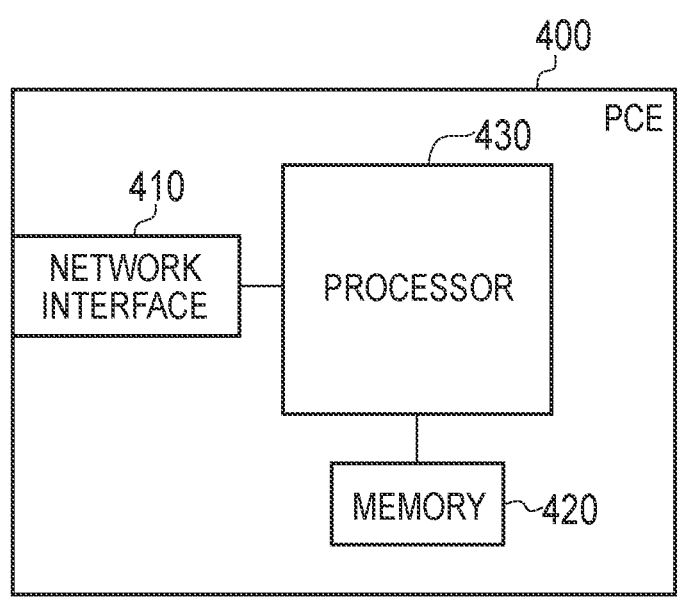
FIG. 7 is a block diagram of a PCE (service control apparatus) 400 according to the first embodiment to the third embodiment.

FIG. 7 is a block diagram of a PCE 400 (service control apparatus). As illustrated in FIG. 7, the PCE 400 includes a network interface 410, a memory 420, and a processor 430. The memory 420 corresponds to a storage unit, and the processor 430 corresponds to a controller.

The network interface 410 is used in communication with the eNB 200 or the UE 100. The memory 420 stores a program to be executed by the processor 430 and information to be used for processing by the processor 430. The processor 430 includes a CPU that performs various types of processing by executing the programs stored in the memory 420. The processor 430 executes a variety of types of processing and various types of communication protocols.

According to the first embodiment, the processor 430 maps a frequency to be used for a D2D application to the D2D application. In addition, the processor 430 stores mapping information indicating a correspondence relationship between the D2D applications and the frequencies in the memory 420. Each of the D2D applications is assigned an identifier (a D2D application ID). The mapping information includes at least one combination of a D2D application ID and a frequency ID. The processor 430 notifies the UE 100 or the eNB 200 of the mapping information. In response to a request from the UE 100 or the eNB 200, the processor 430 may notify a request source issuing the request of the mapping information.

According to the first embodiment, the processor 430 obtains information on a frequency or a plurality of frequencies at which the eNB 200 supports the D2D proximity service. In addition, the processor 430 selects a frequency mapped to a D2D application among the obtained frequency or plurality of frequencies, and maps the selected frequency to the D2D application. Therefore, the mapping information is generated. The processor 430 may obtain information from a plurality of eNBs 200 and generate the mapping information based on the obtained information.

(Mapping of D2D Application and Frequency)

The PCE 400 generates the mapping information by mapping a frequency to a D2D application. For example, the PCE 400 maps a frequency supporting D2D communication to each of a plurality of D2D applications.

The D2D application is a telephone application, a public safety application, a vehicle-to-vehicle communication application, or the like. The D2D application, such as the public safety application or the vehicle-to-vehicle communication application, is required to have a high level of service quality.

The PCE 400 maps a dedicated frequency to a specific D2D application required to have a high level of service quality. The dedicated frequency is set within a frequency band (licensed band) of which a license is given to a cellular communication operator.

For example, the PCE 400 maps the dedicated frequency of the licensed band to the public safety application or the vehicle-to-vehicle communication application. Alternatively, a first dedicated frequency of the licensed band may be mapped to the public safety application and, at the same time, a second dedicated frequency of the licensed band may be mapped to the vehicle-to-vehicle communication application.

Therefore, it is possible to separate the specific D2D application from another application (including a cellular communication application) in terms of frequencies. As a result, interference and congestion hardly occur in the specific D2D application, thereby a predetermined service quality can be ensured.

The PCE 400 may map a frequency shared with another communication (application) to a D2D application not required to have a high level of service quality. For example, the PCE 400 maps a shared frequency of a licensed band to the D2D application not required to have a high level of service quality. Alternatively, the PCE 400 may maps a frequency of an unlicensed band to the D2D application not required to have a high level of service quality. The unlicensed band is a frequency band of which a license is not given to a cellular communication operator.

(Operation Sequence)

Figure 8:
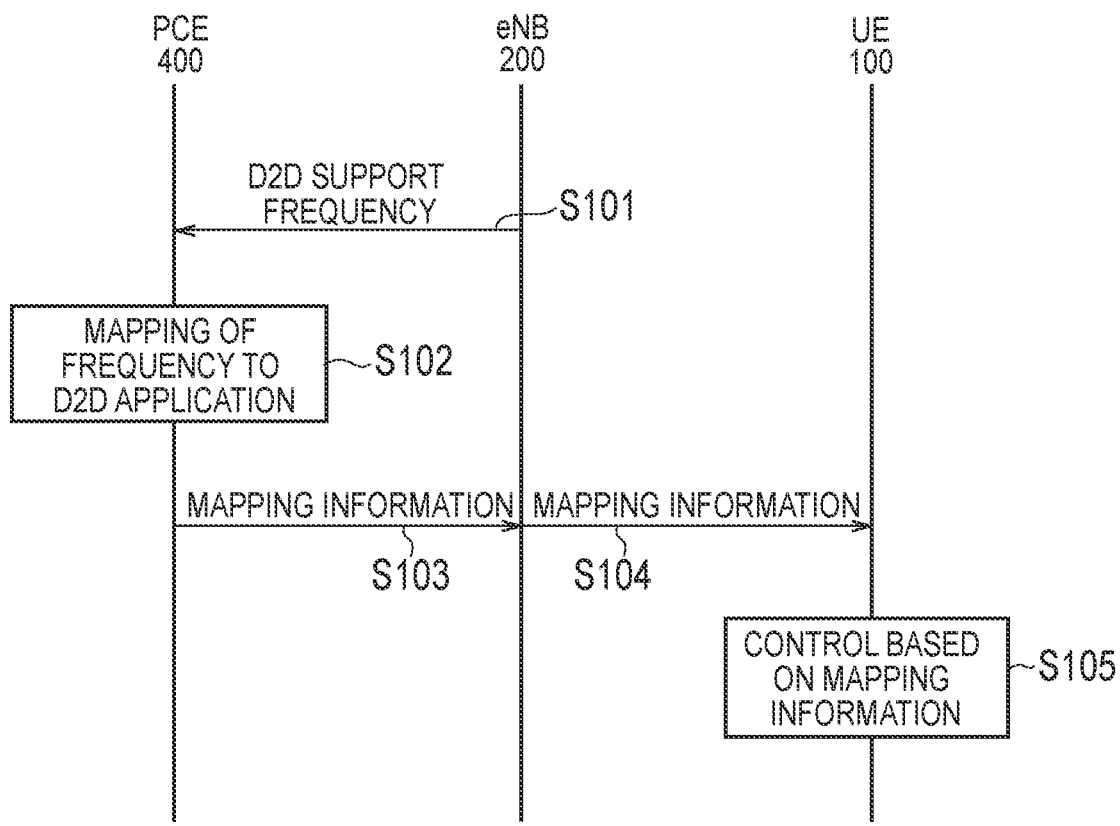
FIG. 8 is a sequence diagram illustrating an operation sequence according to the first embodiment.

FIG. 8 is a sequence diagram illustrating an operation sequence according to the first embodiment.

As illustrated in FIG. 8, in step S101, the eNB 200 notifies the PCE 400 of information on a frequency or a plurality of frequencies at which the eNB 200 supports the D2D proximity service. Herein, the "supporting frequency" is a frequency at which the D2D proximity service is provided actually. Alternatively, the "supporting frequency" may be a frequency at which the D2D proximity service has not yet provided but the D2D proximity service is capable of being provided.

The eNB 200 may notify the PCE 400 of all frequencies operable by the eNB 200, without limitation to a frequency at which the eNB 200 supports the D2D proximity service. Also, in the case of deactivating several frequencies (cells) in order to prompt power saving, the eNB 200 may notify the PCE 400 of frequencies (that is, active frequencies) other than the deactivated frequencies.

In step S102, the PCE 400 selects a frequency mapped to a D2D application among the frequency or plurality of frequencies obtained from the eNB 200, and maps the selected frequency to the D2D application. In a case where a frequency at which the D2D proximity service has not yet provided but the D2D proximity service is capable of being provided is notified by the eNB 200, in order to map the frequency to a D2D application, the PCE 400 may transmit a request to provide the D2D proximity service at the frequency (Activate request) to the eNB 200. Also, in a case where all frequencies operable by the eNB 200 are notified by the eNB 200, in order to map the frequency or the plurality of frequencies to the D2D application, the PCE 400 may transmit a request to provide the D2D proximity service at the frequency or the plurality of frequencies (Activate request) to the eNB 200. The eNB 200 may notify the PCE 400 of permission (OK) or rejection (NG) with respect to the Activate request. Instead of such an explicit Activate request, a suggestive Activate request may be issued by the mapping information of step S103.

In step S103, the PCE 400 notifies the eNB 200 of the mapping information. The mapping information includes at least one combination of a D2D application ID and a frequency ID. The PCE 400 may notify the eNB 200 of the mapping information in response to a request from the eNB 200. Also, the PCE 400 may notify the UE 100 of the mapping information by higher layer signaling, rather than notify the eNB 200 of the mapping information. In this case, the PCE 400 may notify the UE 100 of the mapping information in response to a request from the UE 100.

In step S104, the eNB 200 transmits the mapping information to the UE 100 through dedicated RRC signaling or broadcast RRC signaling. The UE 100 receives the mapping information from the eNB 200.

Note that, when the suggestive Activate request may be issued by the mapping information as described above, the eNB 200 determines whether to activate provision of the D2D proximity service at a frequency indicated by the mapping information (D2D non-support frequency). The eNB 200 may notify the PCE 400 of permission (OK) or rejection (NG) with respect to the Activate request.

In step S105, the UE 100 determines a frequency to be used for the D2D application, based on the mapping information. When a frequency to which a cell (serving cell) of the eNB 200 belongs is identical to a frequency mapped to a D2D application, the UE 100 executes the D2D application in the serving cell (connection destination cell or camping destination cell). Specifically, a higher layer (NAS layer or the like) of the UE 100 notifies a lower layer (an RRC layer, a MAC layer, etc.) of an operation instruction (for example, Discovery instruction) including a frequency ID, based on the mapping information. The higher layer performs the instructed operation (for example, Discovery operation) at a frequency corresponding to the frequency ID. When the UE 100 monitors a Discovery signal from a UE which camps on another cell, the UE 100 may execute the D2D application for the another cell.

In a case where the UE 100 is in a connected state, in order to prompt handover, the lower layer of the UE 100 (the RRC layer, the MAC layer, etc.) may transmit, to the eNB 200, a D2D interest notification including information on a frequency mapped to a D2D application in which the UE 100 is interested (that is, a frequency ID notified by the higher layer). In a case where the UE 100 is in an idle state, in order to prompt handover, the lower layer of the UE 100 (the RRC layer, the MAC layer, etc.) may perform cell reselection by preferentially selecting a frequency mapped to a D2D application in which the UE 100 is interested (that is, a frequency ID notified by the higher layer).

Second Embodiment

A second embodiment of the present application will be described while focusing on a difference from the first embodiment. The second embodiment differs from the aforementioned first embodiment in that an eNB 200 performs a process of mapping a frequency to a D2D application. Besides the above difference, the second embodiment is substantially identical to the first embodiment.

According to the second embodiment, a processor 240 of the eNB 200 maps a frequency to be used for a D2D application to the D2D application. Specifically, the processor 240 obtains, from a PCE 400, information on a frequency or a plurality of frequencies to be used for a D2D application, or information on service quality to be ensured for the D2D application. In addition, the processor 240 selects a frequency to be mapped to a D2D application based on the obtained information, and maps the selected frequency to the D2D application. The processor 240 notifies the PCE

400 of mapping information obtained as described above. The processor 240 may notify the UE 100 of the mapping information.

FIG. 9 is a sequence diagram illustrating an operation sequence according to the second embodiment.

As illustrated in FIG. 9, in step S201, the PCE 400 transmits request information for requesting mapping between a D2D application and a frequency to the eNB 200. The request information includes information on the frequency or the plurality of frequencies to be used for the D2D application. Alternatively, the request information includes information on the service quality to be ensured for the D2D application.

In step S202, the eNB 200 selects a frequency to be mapped to the D2D application from the frequency or the plurality of frequencies at which the eNB 200 supports the D2D proximity service, and maps the selected frequency to the D2D application, based on the request information from the PCE 400.

In step S203, the eNB 200 notifies the PCE 400 of the mapping information. The mapping information includes at least one combination of a D2D application ID and a frequency ID. The eNB 200 may notify the PCE 400 of the mapping information in response to a request from the PCE 400.

Operations of steps S204 to S206 are the same as those of steps S103 to S105 according to the first embodiment.

Third Embodiment

A third embodiment of the present application will be described while focusing on a difference from the first embodiment and the second embodiment. The third embodiment differs from the first embodiment and the second embodiment described above in that an UE 100 stores mapping information in advance. Besides the above difference, the third embodiment is substantially identical to the first embodiment and the second embodiment.

According to the third embodiment, the mapping information is stored in a storage medium (USIM) detachable from the UE 100. A processor 160 of the UE 100 obtains the mapping information from the storage medium (USIM). The mapping information stored in the storage medium (USIM) may be updated by NAS signaling from a PCE 400.

The UE 100 determines a frequency to be used for the D2D application, based on the mapping information. When a frequency to which a cell of the eNB 200 (serving cell) belongs is identical to a frequency mapped to a D2D application, the UE 100 executes the D2D application in the serving cell. In a case where the UE 100 is in a connected state, in order to prompt handover, the UE 100 may transmit, to the eNB 200, a D2D interest notification including information on a frequency mapped to a D2D application in which the UE 100 is interested. In a case where the UE 100 is in an idle state, a lower layer of the UE 100 may perform cell reselection by preferentially selecting a frequency mapped to a D2D application in which the UE 100 is interested.

Other Embodiments

In the aforementioned first to third embodiments, the discovery procedure (Discovery) and the D2D communication (Communication) of the D2D proximity service are not distinguished from each other particularly. However, the "D2D proximity service" in the aforementioned first to third embodiments may be substituted with the "discovery procedure (Discovery)" or the "D2D communication (Communication)".

Although the LTE system is described as an example of a mobile communication system in the aforementioned embodiments, the present application is not limited to the LTE system and may be applied to systems other than the LTE system.

The entire content of U.S. Provisional Patent Application No. 62/055,410 (filed on Sep. 25, 2014) is incorporated in the present specification by reference.

INDUSTRIAL APPLICABILITY

The present application is useful in the field of radio communication.

The invention claimed is:

1. A user equipment that supports vehicle-to-vehicle (V2V) services for enabling direct vehicle-to-vehicle communication, the user equipment comprising:
a processor and a memory coupled to the processor, wherein
the processor is configured to perform processes of:
receiving from a service control apparatus which controls the V2V services, mapping information indicating a mapping between each of the V2V services and each of a plurality of frequencies;
selecting a first frequency for transmitting data of a V2V service to another user terminal, from among the plurality of frequencies, based on the mapping information; and
transmitting frequency identification information identifying the first frequency to a base station when the user equipment is in a connected state in a cell of the base station, wherein
the base station belongs to an E-UTRAN (Evolved-UMTS Terrestrial Radio Access Network), and
the service control apparatus is located outside the E-UTRAN.

2. The user equipment according to claim 1, wherein the processor is configured to perform cell reselection by preferentially selecting the first frequency when the user equipment is in an idle state in a cell of the base station, in response to determining that a frequency to which the cell belongs is not the first frequency.

3. The user equipment according to claim 1, wherein the base station is different from the service control apparatus,
the processor is configured to perform a process of transmitting to the service control apparatus a request for requesting the mapping information, and
the mapping information is transmitted from the service control apparatus in response to the service control apparatus receiving the request from the user equipment.

4. A method used in a user equipment which supports vehicle-to-vehicle (V2V) services for enabling direct vehicle-to-vehicle communication, the method comprising:
receiving from a service control apparatus which controls the V2V services, mapping information indicating a mapping between each of the V2V services and each of a plurality of frequencies;
selecting a first frequency for transmitting data of a V2V service to another user terminal, from among the plurality of frequencies, based on the mapping information; and transmitting frequency identification information identifying the first frequency to a base station when the user equipment is in a connected state in a cell of the base station, wherein
the base station belongs to an E-UTRAN (Evolved-UMTS Terrestrial Radio Access Network), and
the service control apparatus is located outside the E-UTRAN.

* * * * *